United States Patent
Jacob et al.

(10) Patent No.: US 7,867,098 B2
(45) Date of Patent: Jan. 11, 2011

(54) BALL-AND-SOCKET JOINT

(75) Inventors: Werner Jacob, Frankfurt am Main (DE); Martin D. Jacob, Braunschweig (DE)

(73) Assignee: Shaft-Form-Engineering GmbH, Muehlheim (DE)

( * ) Notice: Subject to any disclaimer, the term of this patent is extended or adjusted under 35 U.S.C. 154(b) by 0 days.

(21) Appl. No.: 12/731,429

(22) Filed: Mar. 25, 2010

(65) Prior Publication Data

US 2010/0178992 A1    Jul. 15, 2010

Related U.S. Application Data

(63) Continuation of application No. 12/047,428, filed on Mar. 13, 2008, now Pat. No. 7,727,075, which is a continuation of application No. PCT/EP2006/008297, filed on Aug. 24, 2006.

(30) Foreign Application Priority Data

Sep. 13, 2005    (DE) ................. 10 2005 043 840

(51) Int. Cl.
    *F16D 3/16*    (2006.01)
(52) U.S. Cl. ................. 464/145; 464/89; 464/140
(58) Field of Classification Search ................. 464/89, 464/906, 180, 162, 167, 140, 145, 143, 146
    See application file for complete search history.

(56) References Cited

U.S. PATENT DOCUMENTS

| 3,817,057 A | * | 6/1974 | Orain | 464/89 |
| 4,405,032 A | * | 9/1983 | Welschof et al. | 180/259 |
| 5,374,219 A | * | 12/1994 | Kohara et al. | 464/111 |

* cited by examiner

*Primary Examiner*—Aaron Dunwoody
(74) *Attorney, Agent, or Firm*—Crowell & Moring LLP

(57) ABSTRACT

A ball-and-socket joint comprising an inner hub (1) and an outer hub (6) inside which tracks are disposed that are associated with each other in pairs. At least one ball is arranged in each track in order to transmit torque between the inner hub and the outer hub. The ball-and-socket joint further includes at least one diaphragm which seals the outer hub with respect to a joining element that can be connected in a torsion-proof manner to the inner hub. The outer hub is provided with a metallic interior element encompassing the tracks, a dampening element which embraces the interior element in at least some areas, and a cap that embraces the damping element in at least some areas in order to connect the outer hub to a driving part or a part to be driven. The damping element is made of a material having a modulus of elasticity lower than the modulus of elasticity of the metallic material of the interior element and/or the cap of the outer hub while being greater than the modulus of elasticity of the diaphragm.

12 Claims, 3 Drawing Sheets

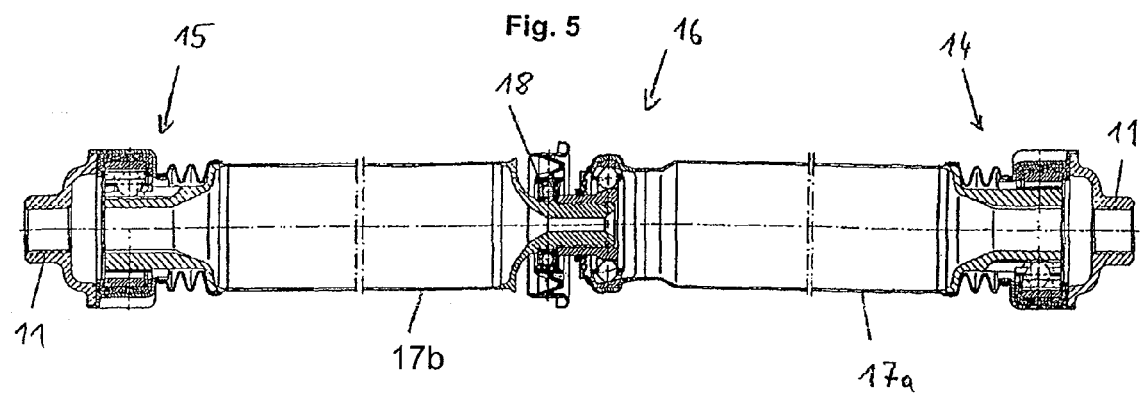
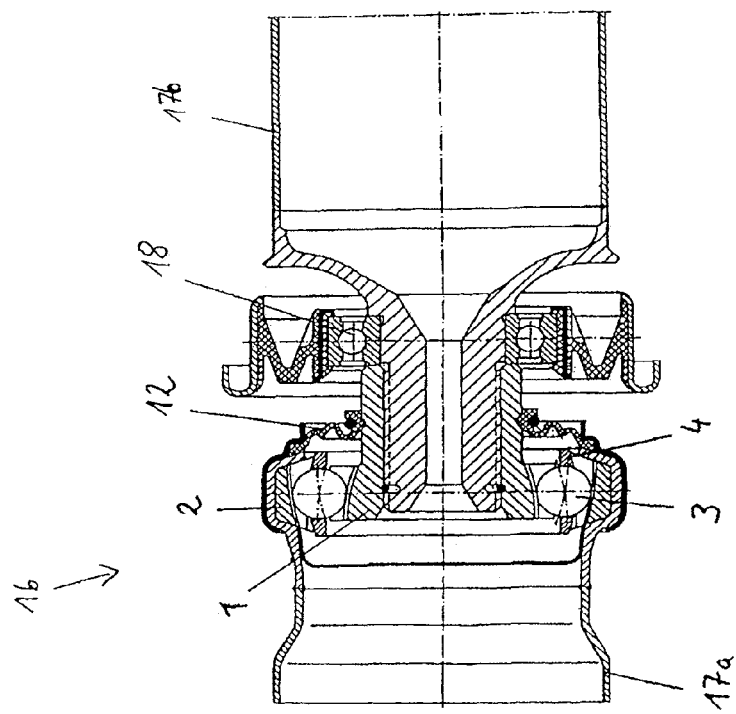

BALL-AND-SOCKET JOINT

CROSS REFERENCE TO RELATED APPLICATIONS

This application is a continuation of U.S. application Ser. No. 12/047,428, filed Mar. 13, 2008, now U.S. Pat. No. 7,727,075, which in turn was a continuation of international patent application no. PCT/EP2006/008297, filed Aug. 24, 2006, designating the United States of America and published in German on Mar. 22, 2007 as WO 2007/031181, the entire disclosure of which is incorporated herein by reference. Priority is claimed based on Federal Republic of Germany patent application no. DE 10 2005 043 840.7, filed Sep. 13, 2005.

BACKGROUND OF THE INVENTION

The invention relates to a ball joint, which can be used for torque transmission in the driveline of a car. Further, the present invention relates to a drive shaft with a ball joint of this type.

U.S. Pat. No. 6,251,021 (=DE 198 31 015) discloses a drive configuration with a constant velocity fixed joint, the outer part of which has a flange extending outwards away from this part, it being possible to connect the flange to an annular damping element. The damping element is positioned between the flange and a connecting part and should be made from an aluminum material, the elastic modulus of which is significantly different from that of the outer part, so that mechanical vibrations, originating in the drive side, for example, in the drive assembly of a car, cannot be fed into the drive line by the connecting part. This known drive configuration assumes a large installation space in the area of the joint, e.g. on the gearbox output. In addition, the time taken up by assembly work increases, due to the additional damping element to be inserted. Further, the damping properties are also regarded as having potential for improvement, since the connecting section and the flange of the outer part of the joint are firmly connected to each other using screws.

Further, U.S. Pat. No. 3,817,057 (=DE 22 40 436) proposes a rotary ball joint, in which the joint is surrounded by a sealing boot made from synthetic or natural rubber. In the area of the joint, this sealing boot is also surrounded by a cap or the like, whereby the outer surface of the outer part of the joint and the inner surface of the sealing boot, as well as the outer surface of the sealing boot and the inner surface of the cap have corresponding profiles for torque transmission. Assembling this rotary ball joint is particularly labor intensive, since the joint must be inserted into the sealing boot. In addition, the soft, elastic material of the sealing boot is unsuited to transmitting high torque transmission.

SUMMARY OF THE INVENTION

It is therefore an object of the present invention to provide a ball joint and a drive shaft of the aforementioned type for transmitting a high torque, which effectively dampens oscillations and vibrations with a small installation space requirement.

This another objects are achieved in accordance with the present invention by providing a ball joint with an inner and outer hub, in each of which paired tracks are arranged, and in each of which at least one ball is disposed between the inner and outer hub for torque transmission, and with at least one boot or the like made from a preferably elastic rubber material, by which the outer hub can be sealed relative to a connecting section which can be connected in a rotationally fixed manner to the inner hub, wherein the outer hub comprises an inner element made from metal having tracks formed therein, a damping element surrounding at least parts of this inner element, and a cap surrounding at least parts of the damping element for connecting the outer hub to a driving component or a component to be driven, whereby the damping element is composed of a material having a modulus of elasticity which is lower than that of the metallic material of the inner element and/or the cap and which is greater than the modulus of elasticity of the boot or the like. Through this arrangement of the damping element within the outer hub, not only is it possible to save space, but the damping element is also suitable for damping oscillations and vibrations which act upon the joint of the present invention in an axial direction, as well as for damping stresses and vibrations acting in a circumferential direction. In addition, the special selection of materials ensures that in spite of good damping, a high torque can be transmitted.

In accordance with one preferred embodiment of the invention, the damping element is comprised of two molded parts, each of which comprises a profiled sleeve-like section and a flange section which extends inwardly from the sleeve like section adjacent the axial end face of the inner element. As a result of this construction, the inner element of the outer hub in which tracks are arranged is surrounded on several sides by the damping element, without a direct connection existing between the inner element of the outer hub and the cap of the outer hub. This improves the damping performance of the ball joint according to the present invention. Further to this advantageous development, the flange sections of the damping element act as a stop to limit the displacement path of the balls and/or a cage, for example, in a slip joint. Hereby, the damping element surrounds the outer surface of the inner element of the outer hub, and, at least partly, the front facing surfaces of the inner element of the outer hub, preferably separately from the boot or the like.

If the outer surfaces of the inner element of the outer hub and the inner surface of the damping element are provided with corresponding or mating profiles, in particular a corrugated outline, an interlocking or form-locking transmission of high torques is also possible with the ball joint of the present invention. In order to accomplish this, the outer surface of the inner element is provided with lug protrusions and the inner surface of the damping element is provided with the corresponding female recesses for interlocking torque transmission. In the same way, the outer surface of the damping element and the inner surface of the cap are provided with corresponding or mating profiles, in particular a corrugated configuration, for interlocking torque transmission.

The material of the damping element can have not only a different modulus of elasticity from the material of the inner elements and/or the cap of the outer hub as well as the boot, but also a different thermal expansion coefficient from these materials. For this purpose it is preferred if the damping element is provided with expansion relief zones, which in particular can be formed by axially extending grooves or the like. It is thereby preferred if the expansion relief zones are formed by axially extending recesses on the side of the damping element facing the inner element and/or the cap. If the ball joint should heat up while in operation, the thermal stress which arises can thus be at least partly absorbed in the expansion relief zones. Further, it is preferred if expansion relief zones are in a radial extension of the groove bottom of the tracks and/or in a radial extension of a ridged area situated between two tracks. In these two areas of the damping element, any thermal stresses which arise can be compensated for without impairing the torque transmission, which is essentially achieved through the substantially radially extending flank areas between the damping element and the inner element or cap of the outer hub.

A particularly good damping effect can be achieved if the damping element has a modulus of elasticity which amounts to less than 50% of the modulus of elasticity of the inner element and/or of the cap of the outer hub. For this purpose, a modulus of elasticity of the damping element which amounts to less than 35% of the modulus of elasticity of the inner element and/or cap is especially preferred. Suitable materials to be considered for the damping element include aluminum, synthetic resins (i.e., plastics) and/or rubber materials.

The underlying purpose of the invention is further achieved through a drive shaft, in particular a longitudinal drive shaft for motor vehicles, which comprises a first, gearbox side joint which is connected to a first shaft section, a second differential side joint, which is connected to a further shaft section, and at least one central or intermediate joint, which is connected to the first and a further shaft section, wherein at least the gearbox side joint and the differential side joint are constructed as ball joints with a damping element provided in the outer hub. The drive shaft in the present invention offers the advantage over drive shafts which are only provided with a single damping element, for example, between two shaft sections, that oscillations and vibrations on both the gearbox side as well as on the differential side are dampened, so that the smooth running of the drive shaft itself is significantly improved.

In a further refinement of the inventive concept, it is contemplated that the gearbox side joint and differential side joint are constructed as slip joints with tracks running in an axial direction and that the central or intermediate joint is a constant velocity joint constructed as a counter track ball joint. This arrangement of the drive shaft in the present invention not only makes assembly simpler, since the joints situated at the ends can be moved axially, but additionally improves the smooth running of the shaft, since all impacts vibrations acting in an axial direction can also be absorbed by the gearbox side and/or the differential side slip joints.

Advantageous embodiments and advantageous application possibilities will also be apparent from the following description of illustrative embodiments and the drawings. Thus all described and/or graphically illustrated features, either individually or in any desired combinations, represent inventive subject matter regardless of their incorporation into the claims or being referenced as such.

BRIEF DESCRIPTION OF THE DRAWINGS

The invention will be described in further detail hereinafter with reference to illustrative preferred embodiments shown in the accompanying drawing figures, in which:

FIG. 5 is a longitudinal section through a drive shaft according to the present invention; and FIG. 6 is a longitudinal section through the center joint of the drive shaft according to FIG. 5.

DETAILED DESCRIPTION OF PREFERRED EMBODIMENTS

Figure 1:
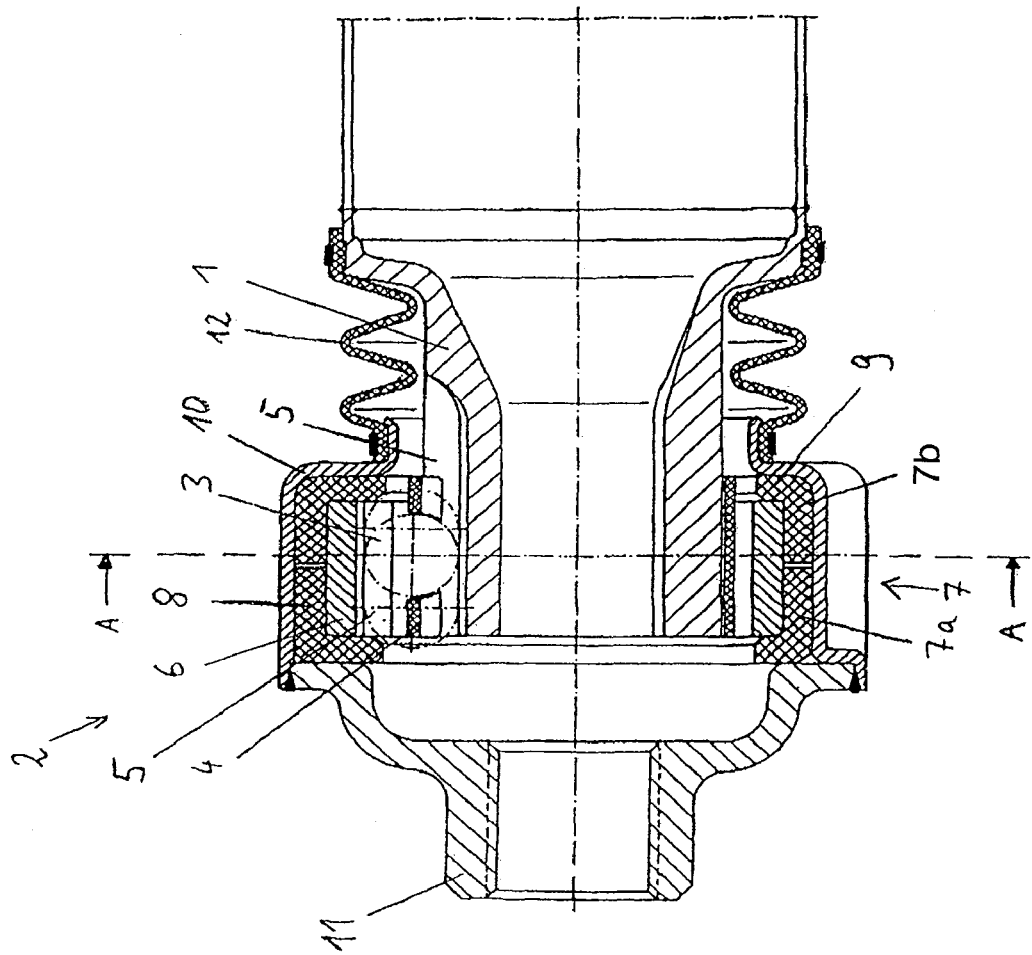
FIG. 1 a longitudinal section through a ball joint according to a first embodiment of the invention.

The ball joints shown in the drawing figures each comprise an inner hub 1 (not shown in FIG. 2), an outer hub 2 and a ball 3, which are arranged in a cage 4 between the inner hub 1 and the outer hub 2. For this purpose associated pairs of aligned tracks 5 are provided in which the balls 3 are accommodated.

Figure 2:
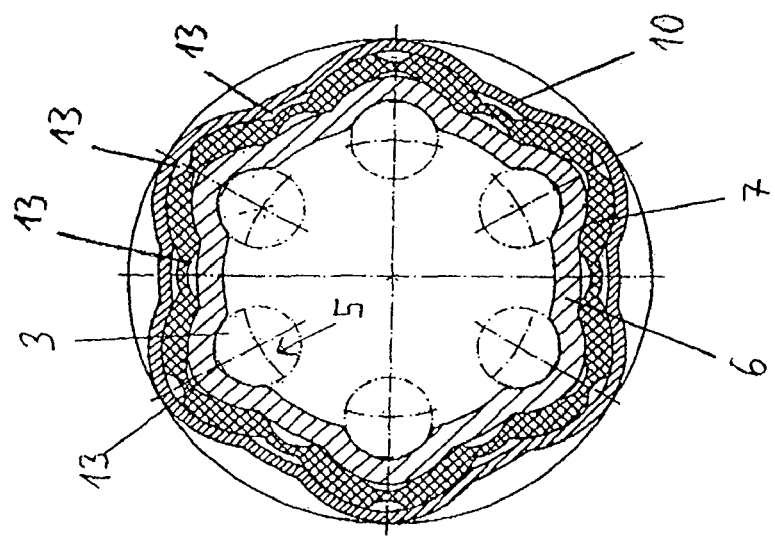
FIG. 2 is a section through the joint according to FIG. 1 taken along the line A-A.
Figure 3:
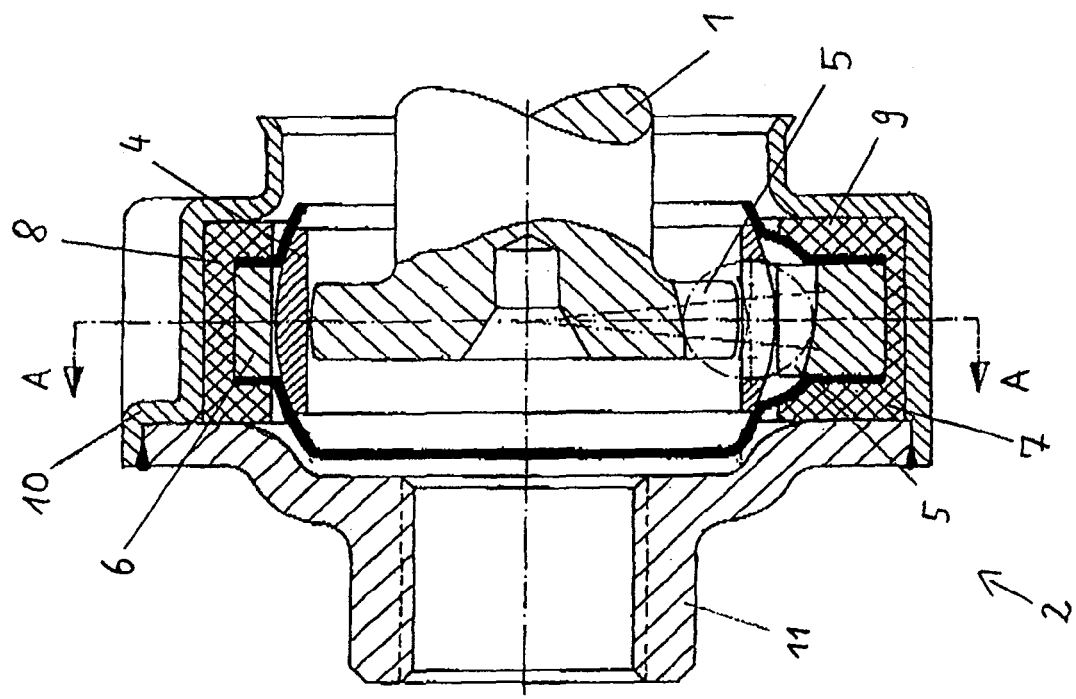
FIG. 3 is a longitudinal section through a ball joint according to a further embodiment of the invention.
Figure 4:
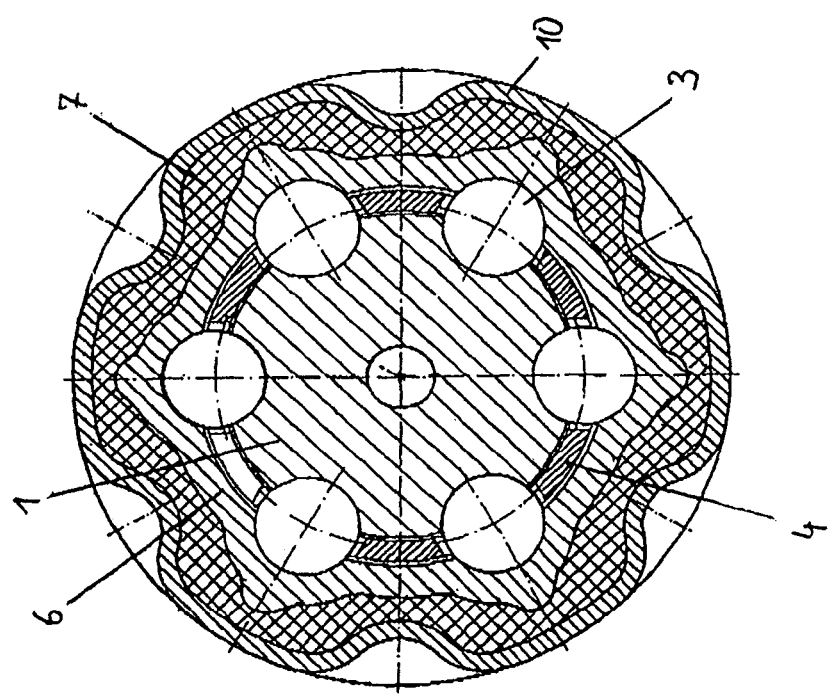
FIG. 4 is a section through the joint according FIG. 3 taken along the line A-A.

The joint shown in FIGS. 1 and 2 is constructed as a slip joint, in which the tracks 5 extend in at least an approximately axial direction, so that the inner hub 1 can be moved a defined distance relative to the outer hub 2, whereby the balls 3 roll along the tracks 5. In contrast to this, the ball joints in FIGS. 3, 4 and 6 are shown as fixed joints constructed as counter track ball joints that essentially allow only an angular movement between the inner hub 1 and the outer hub 2.

The outer hub 2 in the joints shown in FIGS. 1 to 4 is comprised of an at least approximately ring-shaped inner element 6, on the inner surface of which the tracks 5 are provided. The inner element 6 is surrounded by a damping element 7, which is constructed from two molded parts 7a and 7b. Each of the molded parts comprises a profiled sleeve-like section 8 which interlockingly engages the likewise profiled outer surface of the inner element 6. Flange sections 9 extend inwards from the sleeve-like section 8 in the area of the respective axial end face of the inner element 6 and at least partly surround the axial end face of the inner element 6. In doing so, the flange sections 9 of the damping element 7 shown in FIGS. 1 and 3 extend sufficiently far inward that they act, for example, as a stop for the balls 3, or bear against a stop of this type.

Further, the damping element 7 is surrounded by a cap 10, which is joined to a sleeve 11, which in turn serves to connect the outer hub 2 to a driving or driven component. The sleeve 11 shown in FIGS. 1 and 3 is provided with internal teeth, so that the sleeve can be pushed in a rotationally fixed manner onto the end of a shaft or onto a shaft extension of the gear output or the differential input. As can be seen from the illustration in FIGS. 2 and 4, the cap 10 also has a profile which fits the exterior contour of the damping element 7, so that the cap 10 is connected in an interlocking manner to the damping element 7 for torque transmission.

The damping element 7 is comprised of a material, such as aluminum, plastic and/or a rubber material, which has a lower modulus of elasticity than the metallic material of the inner element 6 of the outer hub 2 or the cap 10 of the outer hub. On the outer hub 2, a rubber boot or bellows 12 is provided as shown in FIG. 1 in order to seal the joint relative to a shaft section to which the joint is connected. The material of the boot or bellows has a modulus of elasticity that is lower than that of the damping element 7. The elastic modulus of the damping element 7 can, for example, amount to less than 35% of the elastic modulus of the inner element 6 or the cap 10 of the outer hub 2.

In order to be able to compensate for thermal stress resulting from differing thermal expansion coefficients between the damping element 7 and the adjacent components, the damping element 7 is constructed of two molded parts 7a and 7b, thus enabling a slight axial length change in the damping element 7. In addition, this makes it easier to assemble the damping element 7 on the inner element 6 of the outer hub 2. Furthermore, as shown in FIG. 2, expansion relief zones 13, which extend axially along the damping element 7, are formed on the inner surface and/or the outer surface of the damping element 7. In the embodiment shown in FIG. 2, the expansion relief zones 13 are formed as, for example, groove-type recesses provided in the areas of the damping element 7 which are relatively less stressed during torque transmission, namely in a radial extension of the groove bottom of the tracks 5 or in a radial extension of a ridged area arranged between two tracks.

In the embodiment shown in FIG. 4, the flanks between the inner element 6 of the outer hub 2 and the damping element 7 are constructed in such a way that in order to improve the damping effect while at the same time providing good torque transmission, the damping element 7 in this area has a greater thickness than in the areas which lie in the radial extension of the groove bottom of the tracks or in the radial extension of a ridged area arranged between two tracks 5. Through this, thermal stresses can also be relieved, and in addition expansion relief zones 13 can also be provided in the joint shown in FIGS. 3 and 4, for example, similar to the expansion relief zones 13 shown in FIG. 2.

The drive shaft shown in FIG. 5 has a gearbox or transmission side joint 14 and a differential side joint 15 as well as a central or intermediate joint 16 shown in detail in FIG. 6. In this arrangement, the gearbox side joint 14 and the central joint 16 are linked by a first shaft section 17a, and the differential side joint 15 and the central joint 16 are connected by a second shaft section 17b. The gearbox side joint 14 and differential side joints 15 are both slip joints constructed, for example, in accordance with the embodiment of FIGS. 1 and 2. In contrast to this, central joint 16 is constructed as a fixed joint with which a bearing 18 is associated. In the embodiment shown, the central joint 16 is not provided with a damping element 7 as shown in FIGS. 3 and 4. Alternatively to the arrangement shown in this figure, the central joint 16 can also be provided with a damping element 7.

Through this drive shaft configuration, any axial thrust from the gearbox or the differential is absorbed by the two slip joints 14 and 15. In addition, the damping elements provided for in these joints significantly reduce vibrations and oscillations, so that these are not transmitted from the gearbox to the differential via the drive shaft or vice versa. This significantly increases the smooth running of the drive shaft in the present invention and thus leads to significant improvements in the driving comfort of a motor vehicle.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A ball joint comprising an inner hub and outer hub, in each of which tracks are arranged in pairs, wherein:
    at least one ball is disposed in each pair of tracks between the outer hub and inner hub in order to transmit torque between the inner and outer hubs;
    at least one boot made from a rubber-elastic material is provided for sealing the outer hub relative to a connecting section connected in a rotationally fixed manner to the inner hub;
    said outer hub comprising an inner element made of metal and containing a track of each pair of tracks, a damping element at least partly surrounding the inner element, and a cap surrounding at least part of the damping element where the outer hub is connected to a driving or driven component;
    the damping element is comprised of a material having a modulus of elasticity which is lower than the modulus of elasticity of the metal from which the inner element is made and of the cap of the outer hub, and which is greater than the modulus of elasticity of said boot, and
    the damping element is comprised of two molded parts, and each of said parts comprises a profiled sleeve section and a flange section extending inwards from the sleeve section adjacent an axial end face of the inner element,
    wherein the damping element is separate from the boot, surrounds the outer surface of the inner element, and at least partly surrounds an axial end face of the inner element.

2. A ball joint as claimed in claim 1, wherein the outer surface of the inner element and the inner surface of the damping element are provided with mating profiles.

3. A ball joint as claimed in claim 2, wherein said mating profiles comprise interlocking corrugated configurations for transmitting torque between the inner element and the damping element.

4. A ball joint as claimed in claim 1, wherein the outer surface of the inner element carries protruding lugs and the inner surface of the damping element carries mating female recesses for interlocking torque transmission.

5. A ball joint as claimed in claim 1, wherein the outer surface of the damping element and the inner surface of the cap are provided with a mating profiles.

6. A ball joint as claimed in claim 5, wherein said mating profiles comprise an interlocking corrugated configuration for transmitting torque between the damping element and the cap.

7. A ball joint according to claim 1, wherein the damping element is provided with expansion relief areas formed on a side of the damping element facing the inner element or facing the cap.

8. A ball joint as claimed in claim 7, wherein said expansion relief areas comprise axially extending grooves formed in the damping element.

9. A ball joint as claimed in claim 8, wherein the expansion relief zones are provided in a radial extension of the groove bottom of the tracks, or in a radial extension of a ridged area arranged between two tracks, or both.

10. A ball joint as claimed in claim 1, wherein the damping element has a modulus of elasticity less than 50% of the modulus of elasticity of the inner element or of the cap of the outer hub.

11. A ball joint as claimed in claim 10, wherein the damping element has a modulus of elasticity less than 35% of the modulus of elasticity of the inner element or of the cap of the outer hub.

12. A ball joint as claimed in claim 1, wherein the damping element is at least partly comprised of aluminum or a synthetic resin or a rubber material.

* * * * *